Sept. 30, 1969 R. V. JANC 3,470,479

METHOD AND SYSTEM FOR DETECTING TONE SIGNAL BY MIXING WITH LOCAL OSCILLATION CLOSELY SPACED IN FREQUENCY AND SELECTING DIFFERENCE SIGNAL

Filed Jan. 12, 1966

INVENTOR
ROBERT V. JANC

By Mueller, Aichele and Rauner

Attys.

United States Patent Office 3,470,479
Patented Sept. 30, 1969

3,470,479

METHOD AND SYSTEM FOR DETECTING TONE SIGNAL BY MIXING WITH LOCAL OSCILLATION CLOSELY SPACED IN FREQUENCY AND SELECTING DIFFERENCE SIGNAL

Robert V. Janc, Chicago, Ill., assignor to Motorola, Inc., Franklin Park, Ill., a corporation of Illinois Filed Jan. 12, 1966, Ser. No. 520,235
Int. Cl. H04b 1/06, 1/10
U.S. Cl. 325—364 7 Claims

ABSTRACT OF THE DISCLOSURE

Tone signal for selective calling or selective alerting of station is transmitted as modulation of radio frequency carrier wave. The modulation is derived by a radio receiver and mixed with a stable local oscillation to produce low frequency difference signals. The difference signals below a predetermined frequency are passed by the filter to indicate the presence of the tone. A reed oscillator may be used to provide very stable local oscillations, and it may be continuously operating so that the effect of shock on the reed in the response of the detector is minimized.

The present invention relates to a tone detector which employs a reed oscillator in such a manner as to prevent false output signals from the detector due to the accidental shocking of the reed.

In the past an electromechanical filter comprising a reed and inductance coils has been used in a tone decoding network as a frequency selective device. Such a device responds to a tone signal having a frequency corresponding to the resonant frequency of the reed and produces an output signal for gating a tone oscillator, unsquelching an audio amplifier, or otherwise causing an audible signal to be produced to alert a person paged. However, these prior art circuits are disadvantageous in that the reed, when accidentally shocked and caused to vibrate at the reed resonant frequency, produces an extraneous alterting signal.

It is an object of the present invention to provide a reliable tone detector circuit of simple and easy construction and which requires a minimum number of electronic components.

It is another object of this invention to provide an improved tone detector including a reed oscillator wherein the production of signals by the accidental shocking of the reed in the oscillator does not provide a false response.

The present invention is directed to the provision of means and a method for detecting an incoming tone signal of a preselected frequency, wherein received signals are mixed with a local oscillator signal displaced in frequency from the preselected frequency by a predetermined number of cycles, and thereafter filtering the difference frequency produced to obtain an output altering signal. The detector circuit of the invention includes a transistor mixer to which the incoming tone signals and local oscillations are applied, and which mixes these signals to provide a difference frequency signal which is filtered and amplified, and then utilized to cause an audible alterting tone to be produced.

Figure 1:
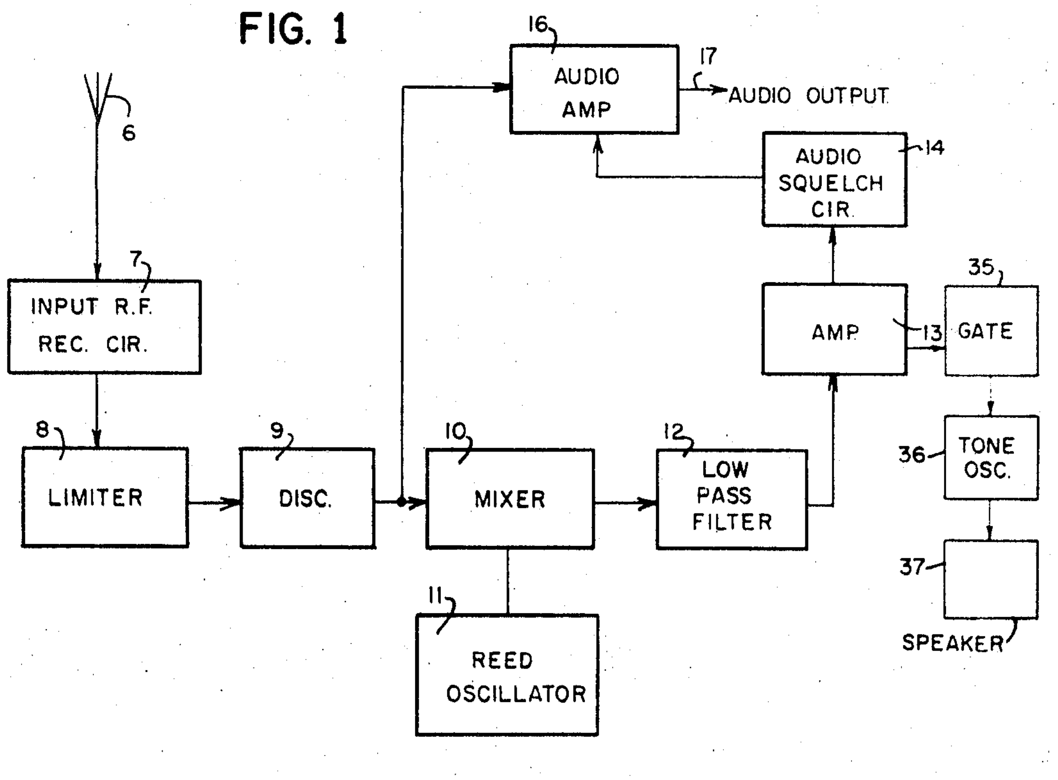
Figure 2:
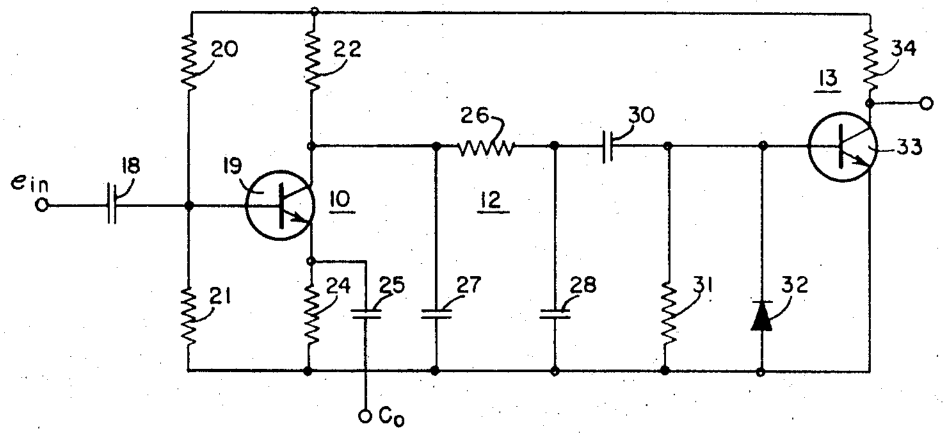

The invention is shown in the accompanying drawing wherein:

FIG. 1 is a block diagram of a radio receiver including the tone detector circuit of the present invention; and FIG. 2 is a schematic diagram of the tone detector circuit of the invention.

Referring now to the drawing, there is shown in FIG. 1 the tone detector circuit of the invention connected in an RF receiver and adapted to enable the audio stages of the receiver when an RF signal including a modulating tone of a preselected frequency arrives at the antenna 6. The antenna 6 is connected to RF receiving circuits 7 which may include one or more mixers and any number of IF amplifiers. The output of the input receiving circuit 7 is connected through a limiter 8 to the input of a discriminator 9 wherein the modulation signal is derived. The modulating signal may include an audio signal or other information signal along with the enabling tone signal. The detected signal is applied to mixer 10 and the tone signal is mixed with local oscillations produced by reed oscillator 11. This mixing produces a difference frequency signal at the input of low pass filter 12. The reed oscillator 11 is displaced in frequency from the frequency of the tone signal to be selected by a few cycles, and mixing of the tone and oscillator signals causes this very low difference frequency to be produced at the output of mixer 10. The difference signal is applied to the low pass filter 12 during reception of RF signals by the antenna 6. The low pass filter 12 is constructed to pass a low frequency output signal, which may be of the order of 3 or 4 cycles per second. Since the reed oscillator is oscillating continuously, whenever a tone of the preselected frequency is included with the signal received at the antenna 6 the difference signal is of the frequency which is passed by the filter.

During reception of the preselected tone frequency, the low pass filter 12 passes an output signal through amplifier 13 to the input of an audio squelch circuit 14 which acts to unsquelch the audio amplifier 16. The output of discriminator 9 includes the audio signal which is applied as the audio input to the audio amplifier 16. Audio amplifier 16 produces an audio signal at terminal 17 when the audio squelch circuit 14 applies a control signal thereto to unsquelch the same.

The present invention is not limited to the particular audio squelch-unsquelch arrangement shown in FIG. 1. If desired, the output of the low pass filter 12 and amplifier 13 can be connected to other forms of alterting means in such a manner as to provide an energizing signal for said alterting means and cause an audible tone to produce thereby. For example, the output of the low pass filter 12 and amplifier 13 can be connected to a gate or clamping circuit 35 (FIG. 1) which when enabled by a signal from the low pass filter 12, will cause a tone oscillator 36 and speaker 37 to be energized and an audible output tone produced thereby.

The reed oscillator 11 may be one of a variety of known oscillators in which a reed is connected in the oscillator circuit to control the frequency thereof. Usually, the reed has a pair of coils coupled thereto which are connected in the oscillator feedback circuit in such a manner that the feedback signal feeds one of the coils to drive the reed, and the vibrating reed produces an output signal in the other coil. The reed type oscillator is particularly adapted for use in the circuit of the present invention since the frequency of a reed oscillator is extremely stable, and oscillator frequency stability is an important factor in producing a predictable difference frequency signal.

The schematic diagram of FIG. 2 illustrates the particular circuit connections of the mixer 10, low pass filter 12 and amplifier 13 in FIG. 1. The output of discriminator 9 is connected through coupling capacitor 18 to the base electrode of the transistor 19 of mixer 10, and the reed oscillator signal is coupled through capacitor 25 to the emitter electrode of the transistor 19. The transistor 19 is biased by voltage divider resistors 20 and 21 and is connected through resistor 24 to a point of reference potential and through load resistor 22 to a point of positive potential. The output at the collector electrode of the transistor 19 is connected to the low pass filter 12 including resistor 26 and capacitors 27 and 28. During tone reception a very low frequency signal is passed by the filter 12 to the coupling and biasing circuit consisting of capacitor 30 and resistor 31. The diode 32 is provided to protect the transistor 33 from reverse breakdown, and may not be required in some instances. Transistor 33 forms the amplifier 13 of FIG. 1, and provides an output signal at the junction of its collector electrode and load resistor 34. Therefore, when a tone signal is applied to the circuit of FIG. 2, it is heterodyned and filtered before being applied to transistor 33 to drive the same into conduction.

The output signal at the collector of transistor 33 can be used to unsquelch an audio circuit as shown in FIG. 1, or it can be used for controlling other alerting means such as a tone oscillator to produce an audible alerting tone. Since the reed oscillator 11 is continuously oscillating, the only consequence of accidental shocks on the reed will be a possible variation in the amplitude of the oscillator signal which will in turn vary the output level of transistor 33 slightly. However, any slight amplitude variations caused by accidental shocking of the reed in the oscillator 11 does not adversely effect the operation of the tone detector circuit of the invention.

The tone detector circuit illustrated is of simple construction and it is not critical of operation. The circuit permits the use of a reed to provide a stable frequency selective device, and eliminates the problem of an undesired response resulting from accidental shocking of the reed.

I claim:

1. The method of detecting a tone signal of a preselected frequency which is transmitted as modulation of a radio frequency carrier wave, including the steps of:
- (a) receiving the radio frequency carrier wave,
- (b) demodulating the radio frequency carrier wave to derive therefrom the modulation signal including the tone signal,
- (c) producing a stable audio frequency signal displaced in frequency a predetermined number of cycles from said preselected frequency,
- (d) mixing the modulation signal with the local oscillator signal to produce difference signals having frequencies equal to the difference in the frequencies of the received modulation signal and the local oscillator signal,
- (e) selecting the difference frequency signals which have a frequency up to said predetermined number of cycles, thereby providing an output signal when a tone signal of the preselected frequency is received.

2. The method of claim 1 including the further steps of:
- (a) amplifying the selected signal to provide a control signal, and
- (b) actuating audible alerting means by the control signal.

3. A tone detector responsive to an alerting tone signal of a preselected frequency which is transmitted as modulation of a radio frequency carrier wave, including in combination:

- (a) means for receiving the radio frequency carrier wave,
- (b) demodulator means for deriving the modulation including the tone signal from the received carrier wave,
- (c) local oscillator means providing an audio frequency signal of a frequency displaced from said preselected frequency of the tone signal by a predetermined number of cycles,
- (d) mixing means connected to said demodulator means and to said local oscillator means for producing a difference signal having a frequency equal to the difference in the frequencies of said received tone signal and said local oscillator signal, and
- (e) filter means connected to the output of said mixing means and constructed to pass a difference signal having a frequency of said predetermined number of cycles, to thereby provide an output signal during reception of the tone signal of the preselected frequency.

4. The tone detector of claim 3 wherein said local oscillator means provides a signal of a frequency displaced from said preselected frequency by the order of four cycles per second, and said filter means passes difference signals having a frequency up to four cycles per second.

5. The detector of claim 3 wherein said local oscillator means is a reed oscillator.

6. The detector of claim 3 wherein:
- (a) said mixing means is a transistor having input, output and control electrodes, and includes means for applying said local oscillations to said input electrode and for applying said tone signals to said control electrode to thereby produce a difference frequency signal at said output electrode,
- (b) said filter means includes a resistance-capacitance low pass filter connected to the output electrode of said mixing means, and
- (c) a transistor amplifier connected to said filter means for providing an output signal therefrom for actuating audible alerting means.

7. The detector of claim 6 wherein said local oscillator means is a reed oscillator.

References Cited

UNITED STATES PATENTS

| | | | |
|---|---|---|---|
| 2,980,794 | 4/1961 | Hargreaves et al. | 325—466 XR |
| 3,131,354 | 4/1964 | Battin | 325—478 XR |
| 3,296,535 | 1/1967 | Murray | 325—478 XR |
| 3,319,169 | 5/1967 | Axe | 325—392 |
| 3,332,034 | 7/1967 | Sanger et al. | 331—116 |

ROBERT L. GRIFFIN, Primary Examiner

R. S. BELL, Assistant Examiner

U.S. Cl. X.R.

325—466, 478